US008825513B1

(12) United States Patent  (10) Patent No.: US 8,825,513 B1
Misra et al.  (45) Date of Patent: Sep. 2, 2014

(54) ADAPTIVE SUBSCRIBER RETENTION BASED ON FORECASTED RETENTION VALUE OF PAYING SUBSCRIBERS

(75) Inventors: Nilendu Misra, Mountain View, CA (US); Sanjay Channarayapatna Ramakrishna, Bangalore (IN); Norman Happ, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 36 days.

(21) Appl. No.: 13/484,161

(22) Filed: May 30, 2012

(51) Int. Cl.
*G06Q 10/00* (2012.01)
*G06Q 40/00* (2012.01)
*G06Q 10/06* (2012.01)

(52) U.S. Cl.
CPC .................................. *G06Q 10/0635* (2013.01)
USPC .......................... 705/7.28; 705/7.31; 705/304

(58) Field of Classification Search
CPC .. G06Q 10/0635; G06Q 30/016; G06Q 30/01
USPC ........................................ 705/7.28, 7.31, 304
See application file for complete search history.

(56) References Cited

U.S. PATENT DOCUMENTS

| | | | | |
|---|---|---|---|---|
| 6,301,471 B1* | 10/2001 | Dahm et al. | .................. | 455/405 |
| 2003/0158771 A1* | 8/2003 | Shen et al. | ...................... | 705/10 |
| 2005/0135593 A1* | 6/2005 | Becerra et al. | ........... | 379/220.01 |
| 2007/0118419 A1* | 5/2007 | Maga et al. | ...................... | 705/10 |
| 2007/0185867 A1* | 8/2007 | Maga et al. | ........................ | 707/6 |
| 2009/0190750 A1* | 7/2009 | Xie et al. | ................... | 379/266.03 |
| 2009/0307074 A1* | 12/2009 | Sharma | ....................... | 705/14.25 |
| 2013/0054306 A1* | 2/2013 | Bhalla et al. | .................. | 705/7.31 |

OTHER PUBLICATIONS

SLP InfoWare Targets ISPs with New P-CRM Solution for Reducing Customer Churn and Increasing Retention. Business Editors/High-tech Writers. Business Wire [New York] May 3, 2000: 1.*
Bansal, Parveen. Technology out of place. The Banker 151. 907 (Sep. 2001): 200-201.*

* cited by examiner

*Primary Examiner* — Timothy Padot
(74) *Attorney, Agent, or Firm* — Osha Liang LLP (57) ABSTRACT

A method to process cancellation requests. The method includes receiving, by a computer processor and from a first user, a first request to cancel a first subscription to an online service, calculating, by the computer processor in response to the first request: a first retention value score of the first user based on a first usage profile of the first user interacting with the online service, and a first retention value threshold based on a first availability measure of support agents for the online service, and sending, by the computer processor and in response to the first retention value score exceeding the first retention value threshold, a message to the first user to contact at least one of the support agents to discuss cancelling the first subscription.

21 Claims, 4 Drawing Sheets

ADAPTIVE SUBSCRIBER RETENTION BASED ON FORECASTED RETENTION VALUE OF PAYING SUBSCRIBERS

BACKGROUND

The subscription business model is a business model where a customer pays a subscription fee to access the product/service. The model was pioneered by magazines and newspapers, but is now used by many businesses including software providers, business solutions providers, financial services providers, etc. Renewal of a subscription may be periodic and activated automatically. Cancellation of a subscription may be made by accessing the website of the software providers, business solutions providers, financial services providers, etc. or by contacting customer service personnel via email or telephone.

SUMMARY

In general, in one aspect, the invention relates to a method to process cancellation requests. The method includes receiving, by a computer processor and from a first user, a first request to cancel a first subscription to an online service, calculating, by the computer processor in response to the first request: a first retention value score of the first user based on a first usage profile of the first user interacting with the online service, and a first retention value threshold based on a first availability measure of support agents for the online service, and sending, by the computer processor and in response to the first retention value score exceeding the first retention value threshold, a message to the first user to contact at least one of the support agents to discuss cancelling the first subscription.

In general, in one aspect, the invention relates to a cancellation processing system. The system includes (i) a processor, (ii) a retention value calculator executing on the processor and configured to calculate, in response to a first request from a first user to cancel a first subscription to an online service, a first retention value score of the first user based on a first usage profile of the first user interacting with the online service and a first retention value threshold based on a first availability measure of support agents for the online service, and (iii) a user module executing on the processor and configured to receive the first request from the first user, send, in response to the first retention value score exceeding the first retention value threshold, a message to the first user to contact at least one of the support agents to discuss cancelling the first subscription, and (iv) a repository configured to store the first usage profile.

In general, in one aspect, the invention relates to a non-transitory computer readable medium storing instructions to process cancellation requests. The instructions, when executed by a computer processor, includes functionality to receive, from a first user, a first request to cancel a first subscription to an online service, calculate, in response to the first request, a first retention value score of the first user based on a first usage profile of the first user interacting with the online service, and a first retention value threshold based on a first availability measure of support agents for the online service, and send, in response to the first retention value score exceeding the first retention value threshold, a message to the first user to contact at least one of the support agents to discuss cancelling the first subscription.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a system and a method to forecast the retention value of paying subscribers to an online application based on multiple behavioral parameters and (i) direct a subscriber who has a retention value exceeding a threshold and requests to cancel the subscription to talk to a human agent in an effort to retain this subscriber, and (ii) allow a subscriber who has a retention value less than the threshold to cancel instantaneously using an automated interface (e.g., an online cancellation menu) without going through a human agent. In one or more embodiments, if the queue of human agents talking to higher retention value subscribers to retain them is too busy, the threshold is adjusted higher, and vice-versa. In one or more embodiments, the retention value is determined based on real-time statistical analysis of a user's revenue expectations, product (i.e., the online application) usage, social data, and other user profile.

Figure 1:
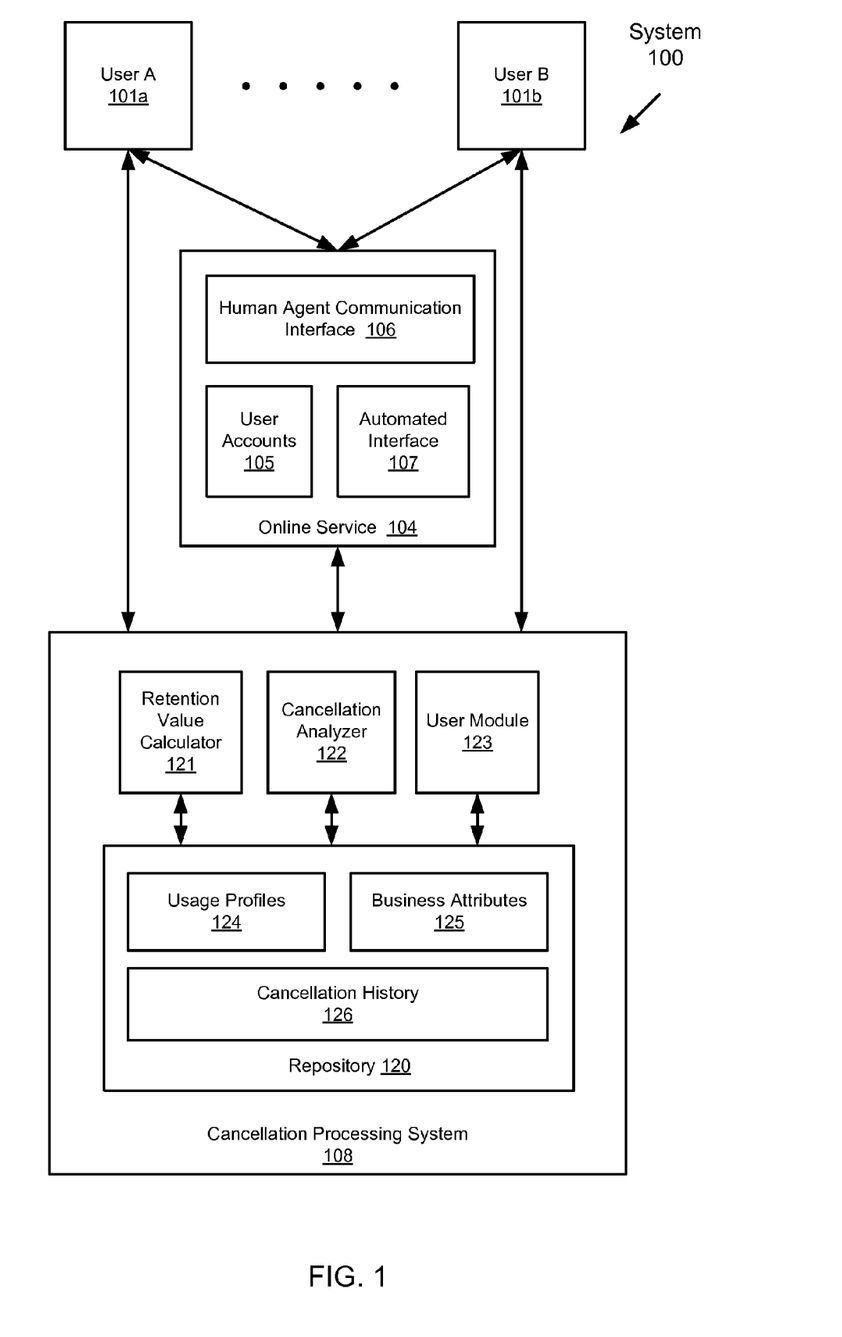
FIG. 1 shows a schematic diagram of an adaptive subscriber retention system based on forecasted retention value of paying subscribers in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes users (e.g., user A (101a), user B (101b), etc.) of an online service (104) coupled to a cancellation processing system (108). In one or more embodiments, the online service (104) includes computer facilities (not shown) for providing application software (not shown) access and/or other services to the users (e.g., user A (101a), user B (101b), etc.). In particular, the users (e.g., user A (101a), user B (101b), etc.) access the online service (104) using an automated interface (107) and based on user accounts (105). In addition, the online service (104) includes a human agent communication interface (106) for providing technical support, customer service, etc. via human support agents (not shown). Further, the cancellation processing system (108) includes a retention value calculator (121), a cancellation analyzer (122), a user module (123), and a repository (120) storing usage profiles (124), business attributes (125), and cancellation history (126).

Various components of the system (100) are coupled via a computer network (not shown). For example, the computer network may include wired and/or wireless portions of public and/or private data network, such as wide area networks (WANs), local area networks (LANs), Internet, a mobile phone network, and etc. In one or more embodiments, the online service (104) and the cancellation processing system (108) may be operated by different entities under a business agreement. In one or more embodiments, the online service (104) and the cancellation processing system (108) may be integrated and operated by the same entity.

In one or more embodiments, the users (e.g., user A (101a), user B (101b), etc.) may include a small business owner and/or a business entity represented by an individual (e.g., an employee, a contractor, or other individual affiliated with the business entity). In one or more embodiments, each of the users (e.g., user A (101a), user B (101b), etc.) subscribes to the online service (104) and establish one or more of the user accounts (105) for administering the service subscription(s). In one or more embodiments, the users (e.g., user A (101a), user B (101b), etc.) may initiate, renew, or cancel a subscription to the online service (104) via the automated interface (107) of the online service (104). For example, the automated interface (107) may include a website, an automated telephone interface, or other suitable interface without human-to-human interaction. In one or more embodiments, the online service (104) provides its users (e.g., user A (101a), user B (101b), etc.) access to enterprise software, accounting software, office productivity software suites, graphics software, media database, etc. under subscription agreements. Specifically, each subscription agreement specifies one or more software application(s) and/or other service item(s) accessible by a corresponding user (e.g., user A (101a), user B (101b), etc.). For example, the online service (104) may provide accounting software (not shown) access to the user A (101a) that has established a user account (i.e., one of the user accounts (105)) for its subscription. The user A (101a) may also establish multiple user accounts (i.e., separate ones of the user accounts (105)) for multiple employees using the subscribed accounting software. From time to time, the users (e.g., user A (101a), user B (101b), etc.) may contact human support agents (not shown) of the online service (104) to discuss various support topics, such as technical questions/answers, account administration issues, etc. In one or more embodiments, the human agent communication interface (106), which may include a human-to-human telephone interface, an online chat interface, etc., allows interactive communication between the users (e.g., user A (101a), user B (101b), etc.) and human support agents (not shown).

In one or more embodiments of the invention, the cancellation processing system (108) includes the repository (120) that is configured to store the usage profiles (124), business attributes (125), and cancellation history (126). For example, the repository (120) may be a disk storage device, a non-volatile semiconductor memory, or any other suitable computer data storage device. In one or more embodiments, one or more of the usage profiles (124), business attributes (125), and cancellation history (126) may be retrieved directly from the user accounts (105) by the cancellation processing system (108). In one or more embodiments, one or more of the usage profiles (124), business attributes (125), and cancellation history (126) may be generated by the cancellation processing system (108) based on information retrieved from the user accounts (105).

In one or more embodiments, the usage profiles (124) include usage information of each of the users (e.g., user A (101a), user B (101b), etc.). For example, usage information of the user A (101a) may be included in the usage profiles (124) and indexed by a user ID of the user A (101a) that correlates to the account(s) of the user A (101a) in the user accounts (105). In particular, the usage information of user A (101a) may include a frequency of using the subscribed accounting software, a period of inactivity with respect to using the subscribed accounting software, a number of activated functional modules in the subscribed accounting software, a number of completed data import to the subscribed accounting software, a number of completed transactions logged in the subscribed accounting software, a number of user accounts set up for the accounting software, and a number of duplicate subscriptions (e.g., one or more free trial subscription(s) and/or paid subscription(s)) to the online service (104), etc.

In one or more embodiments, the business attributes (125) include business information of each of the users (e.g., user A (101a), user B (101b), etc.). For example, the business information of the user A (101a) may be included in the business attributes (125) and indexed by the user ID of the user A (101a). In particular, the business information of user A (101a) may include primary email address, a number of employees, a subscription channel (e.g., one of multiple websites where online subscription is available), whether online banking is used by the user A (101a), and whether checks are used by the user A (101a).

In one or more embodiments, the cancellation history (126) includes information related to previous cancellation activities of the online service (104). For example, the cancellation history (126) may include a historical cancellation percentage that represents a percentage of the users (e.g., user A (101a), user B (101b), etc. as well as prior users) that cancelled the online service within a pre-determined time period (e.g., last month, last quarter, last year, a time period with a particular starting/ending dates, etc.).

In one or more embodiments, the user module (123) is configured to receive cancellation requests from the users (e.g., user A (101a), user B (101b), etc.) and return cancellation related messages in response to the received cancellation requests. For example, a cancellation request may be initiated by a user (e.g., user A (101a), user B (101b), etc.) via the automated interface (107) and relayed to the cancellation processing system (108) by the online service (104). Accordingly, the cancellation related messages may be sent to the requesting users (e.g., user A (101a), user B (101b), etc.) via the automated interface (107) or sent directly (e.g., via email or other direct contact means). In one or more embodiments, the contents of the cancellation related messages are user dependent. Different users requesting cancellation may receive a different message from the user module (123) dependent on a retention value score of each particular user and a retention value threshold. The retention value score represents a measure of how valuable the user is to retain, i.e., the more valuable the user is considered to retain, the higher the retention value score of the user. The retention value threshold represents a limit that the user's retention value score has to exceed before it is considered worthwhile to allocate a human agent to physically interact with the user in an attempt to reverse a cancellation request from the user. For example, upon submitting a cancellation request via the automated interface (107), the user A (101a) may receive a message directly confirming cancellation of its subscription because the retention value score of the user A (101a) is determined to be less than the retention value threshold, while the user B (101b) my receive a different message prompting him/her to contact a human agent of the online service (104) to discuss the cancellation request because the retention value score of the user B (101b) is determined to exceed the retention value threshold. In one or more embodiments, the retention value score of each particular user and the retention value threshold are determined by the retention value calculator (121) and the cancellation analyzer (122) as described below.

In one or more embodiments, the cancellation analyzer (122) is configured to determine, based on the aforementioned historical cancellation percentage and according to a pre-determined algorithm, a formula for calculating the retention value score and the retention value threshold. As noted above, the historical cancellation percentage of the online service (104) is a statistical tally based on the cancellation history (126) and represents a percentage of the users that cancelled the online service within a pre-determined time period.

In one or more embodiments, the formula for calculating the retention value score and the retention value threshold is determined using statistical methods, such as linear regression, multivariate analysis, etc. In particular, the formula represents the retention value score and the retention value threshold as empirical functions of the aforementioned usage profile parameters, business attribute parameters, revenue impact parameters, agent availability parameters, etc. In the statistical methods, an initial formula is first established for subsequent iterative adjustments (i.e., regressions) to converge into a final formula. Specifically, a hypothetical retention value score and a hypothetical retention value threshold are calculated using the initial formula for each of the users during the pre-determined time period. Accordingly, the initial formula is adjusted based on a comparison of the historical cancellation percentage and a percentage of users having the hypothetical retention value score being less than the hypothetical retention value threshold. The rationale of the adjustment is based on an empirical observation that those users having retention value score less than the hypothetical retention value threshold are likely to have cancelled the service. Iteratively, the adjusted formula is used in subsequent regressions to converge into the final formula to be used by the retention value calculator (121).

In one or more embodiments, the retention value calculator (121) is configured to calculate, in response to a cancellation request received by the user module (123) and using the formula determined by the cancellation analyzer (122), a retention value score of the requesting user based on the aforementioned usage profile of the requesting user. An example algorithm for calculating the retention value score based on the usage profile is described in reference to FIG. 2 below. In one or more embodiments, the retention value calculator (121) is further configured to adjust the retention value score based on the aforementioned business attribute of the requesting user. An example algorithm for adjusting the retention value score based on the business attribute is described in reference to FIG. 2 below. In one or more embodiments, the retention value calculator (121) is further configured to further adjust the retention value score based on one or more of an estimated revenue impact of the cancellation and an availability measure of support agents for the online service (104). In particular, the adjusted retention value score is proportional to the revenue impact and the support agent availability.

In one or more embodiments, the retention value calculator (121) is configured to determine a retention value threshold based on the availability measure of support agents for the online service (104). In particular, the retention value threshold is inversely proportional to the availability of the support agents when the cancellation request is received. In one or more embodiments, the retention value calculator (121) is further configured to adjust the retention value threshold based on the estimated revenue impact of cancelling the subscription. In particular, the adjusted retention value threshold is inversely proportional to the estimated revenue impact.

Additional details of calculating the retention value score of each particular user and determining the applicable retention value threshold are described in reference to FIG. 2 below. In particular, the method shown in FIG. 2 uses a statistical method, such as linear regression, multivariate analysis, etc., to identify a formula for calculating the retention value score and the applicable retention value threshold based on various parameters of each particular user. In statistics, linear regression is an approach to modeling the relationship between a scalar variable y (e.g., the retention value score or the retention value threshold) and one or more explanatory variables X (e.g., usage profile parameters, business attribute parameters, revenue impact parameters, agent availability parameters, etc.). Multiple explanatory variables are used in the method shown in FIG. 2, which is referred to as multiple regression.

In linear regression, data are modeled using linear functions, and unknown model parameters are estimated from the data. Such models are called linear models. In one or more embodiments, the linear regression uses a model in which the conditional mean of y given the value of X is an affine function of X. In one or more embodiments, the linear regression uses a model in which the median, or some other quantile of the conditional distribution of y given X is expressed as a linear function of X. As is known to those skilled in the art, the linear regression is based on the conditional probability distribution of y given X, rather than on the joint probability distribution of y and X, which is the domain of multivariate analysis.

Figure 2:
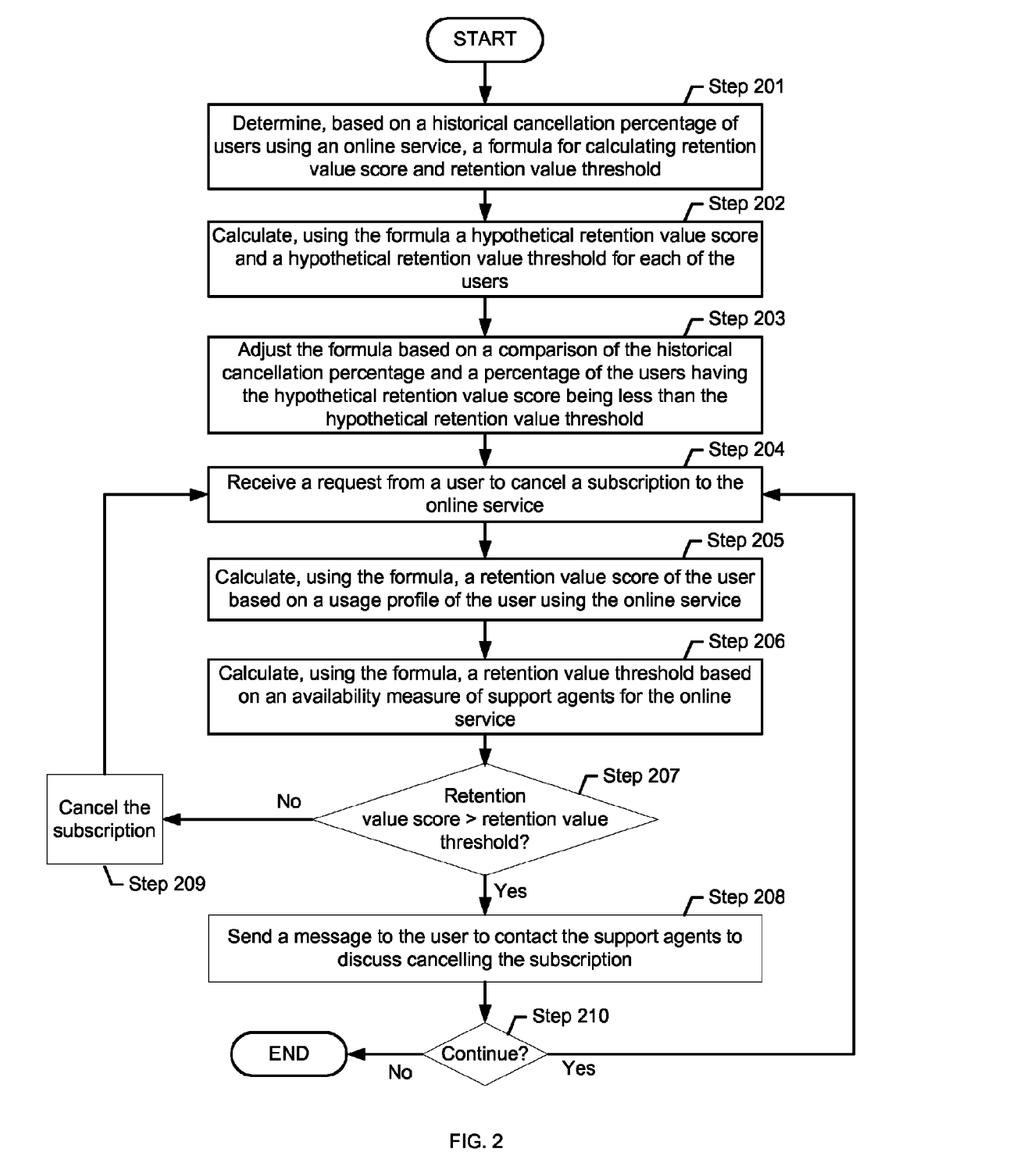
FIG. 2 shows a flowchart of a method of adaptive subscriber retention based on forecasted retention value of paying subscribers in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100), in particular the cancellation processing system (108) to process cancellation requests from users of an online service according to at least a retention value score and a retention value threshold calculated based on each particular user's information and availability of human agents of the online service. As described above, the retention value score represents a measure of how valuable the user is to retain, i.e., the more valuable the user is considered to retain, the higher the retention value score of the user. The retention value threshold represents a limit that the user's retention value score has to exceed before it is considered worthwhile to allocate a human agent to physically interact with the user in an attempt to reverse a cancellation request from the user.

Initially in Step 201, a formula for calculating the retention value score and the retention value threshold is determined according to a pre-determined algorithm based on historical cancellation percentage of the online service users. As noted above, the historical cancellation percentage represents a percentage of the users that cancelled the online service within a pre-determined time period, such as a month, a quarter, a year, etc. In one or more embodiments, the pre-determined algorithm is based on statistical methods, such as linear regression, multivariate analysis, etc.

In Step 202, a hypothetical retention value score and a hypothetical retention value threshold are calculated, using the formula determined in Step 201, for each of the users. In particular, the calculations are based on parameters during the pre-determined time period (e.g., last month, last quarter, last year, month-to-date, quarter-to-date, year-to-date, or other time period with a particular start/end time, etc.).

In Step 203, the formula is adjusted based on a comparison of the historical cancellation percentage and a percentage of the users having the hypothetical retention value score less than the hypothetical retention value threshold. As noted above, the rationale of the adjustment is based on an empirical observation that those users having retention value score less than the hypothetical retention value threshold are likely to have cancelled the service. In one or more embodiments, the method Steps 202 and 203 are iteratively performed in subsequent regressions to converge into the final formula.

In one or more embodiments, the linear regression is used in the method Steps 202 and 203 to fit a predictive model to the observed data set (i.e., historical cancellation percentage) and variable values (i.e., the aforementioned usage profile parameters, business attribute parameters, revenue impact parameters, agent availability parameters, etc.). This predictive model includes a retention value score and an applicable retention value threshold for each historical user and is based on the assumption that if a user's retention value score is less than the applicable retention value threshold, the user is likely to cancel and any human agent's effort to retain the user is not worthwhile. After developing such a model, if a cancellation request is received from a current user, the fitted model is used to make an assessment of whether retention attempt by a human agent is worthwhile. Specifically, the retention value score and the applicable retention value threshold are calculated, using the predictive model, for the current user requesting cancellation. Those skilled in the art, with the benefit of this disclosure, will appreciate that other statistical methods, such as multivariate analysis may be equally applicable to fit the predictive model for the method Steps 202 and 203.

In Step 204, a request to cancel a subscription to the online service is received from a user. In response, the retention value score of the requesting user is calculated in Step 205. For example, the calculation uses the formula that has been determined and iteratively adjusted in Steps 202 and 203. In one or more embodiments, the calculation is based on the usage profile of the requesting user that includes one or more of a frequency of using the subscribed online service, a period of inactivity with respect to using the subscribed online service, a number of activated functional modules in the subscribed online service, a number of completed data import to the subscribed online service, a number of completed transactions logged in the subscribed online service, a number of user accounts set up for the online service, and a number of duplicate subscriptions (e.g., one or more free trial subscription(s) and/or paid subscription(s)) to the online service, etc.

In one or more embodiments, the calculated retention value score is adjusted based on a business attribute of the requesting user, estimated revenue impact associated with the requesting user, and an availability measure of the human support agents. For example, the business attribute may include one or more of a type of primary email address (i.e., a webmail, a mail account with a dedicated domain name, etc.), a number of employees, a channel where the subscription was initiated (i.e., the particular website the user initially signed up to use the online service), whether online banking is used by the user, and whether checks are used by the user. In addition, the retention value score is proportional to the estimated revenue impact, e.g., the revenue impact is higher if the user subscribes to multiple service items or multiple functional modules from the online service. Further, the retention value score is proportional to availability of human support agents when the cancellation request is received. Said in other words, if many support agents are available when the user requests to cancel, the retention value score may be assigned a relatively higher number.

In Step 206, in response to the cancellation request received in Step 204, the retention value threshold is calculated based on an availability measure of human support agents for the online service. For example, the retention value threshold is inversely proportional to the availability of the human support agents when the cancellation request is received. Said in other words, if more human support agents are available, the retention value threshold is lowered to allocate them to more of the users requesting cancellation in an attempt to reverse these requests. In one or more embodiments, the retention value threshold is adjusted based on an estimated revenue impact of the user cancellation. For example, the retention value threshold is inversely proportional to the estimated revenue impact. Said in other words, if the revenue impact associated with the user requesting cancellation is higher, the retention value threshold is adjusted lower to increase the likelihood for allocating a human agent to retain the requesting user.

In Step 207, a determination is made as to whether the retention value score of the user requesting cancellation exceeds the applicable retention value threshold. If the answer is no, the method proceeds to Step 209, where the user request to cancel the online service is confirmed directly without any human intervention. Once cancelled, the method returns to Step 204 to continue processing additional cancellation requests. If the answer in Step 207 is yes, the method proceeds to Step 208, where a message is sent to the requesting user to contact a human support agent to discuss cancelling the subscription. Specifically, the human support agent will make an attempt to reverse the cancellation request from this user. Once the requesting user is sent to the human support agent, the method proceeds to Step 210 to determine whether to continue processing additional cancellation requests. If the answer is no, the method ends. If the answer is yes, the method returns to Step 204.

Figure 3A:
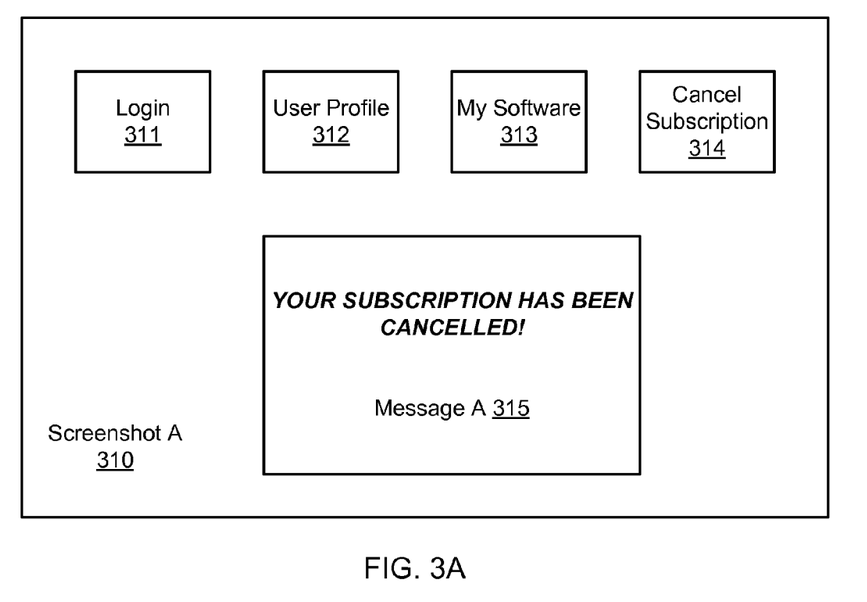
FIGS. 3A and 3B show screenshots of an adaptive subscriber retention system in accordance with one or more embodiments of the invention.
Figure 3B:
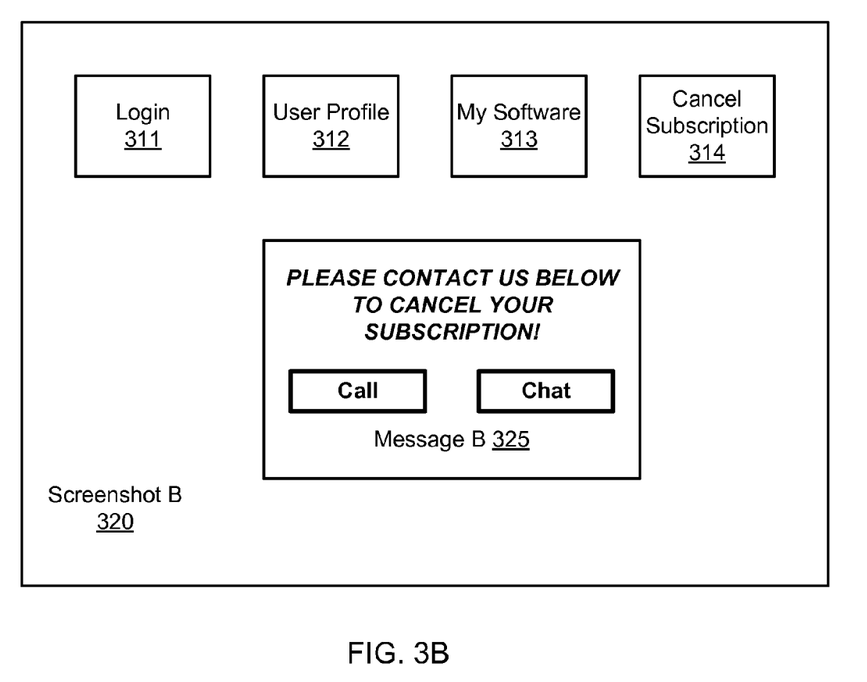

FIGS. 3A and 3B show an application example in accordance with one or more embodiments of the invention. This example application may be practiced using the system (100) of FIG. 1 and based on the method described with respect to FIG. 2 above. As shown in FIGS. 3A and 3B, both an example screenshot A (310) and an example screenshot B (320) of an online service "QBO" have an automated interface including a number of command buttons/tabs such as the login (311), user profile (312), my software (313), and cancel subscription (314). The example depicted in FIGS. 3A and 3B is related to an example scenario of reducing about 75% call volume (e.g., 150 calls reduced from original call volume of 200 calls a day) at a human support agent call center of the online service "QBO" by targeting, based on an algorithmic computation of retention value, which users to save (i.e., make an attempt to retain) using human agents, and which users to allow to cancel directly via the cancel subscription (314) command without human intervention. Prior to instituting this adaptive subscriber retention, human support agents are involved with every user requesting cancellation, irrespective of the user's behavioral pattern. This resulted in 200+ calls a day.

The adaptive subscriber retention of the application example is based on historical cancellation statistics of 400,000+ users of the online service QBO that includes the following empirical observations:

1. A multi-user company has about 30% less probability to cancel than a single-user company.
2. A company that starts QBO with a discount has about 15% less probability to cancel than if it started without discount.

3. When a company logs on to QBO more than 8 times during the first month, it has about 2 times less probability to cancel than if it logs on less than 8 times.

4. When a company's primary contact email is not from a webmail, it has about 20% less probability to cancel than it uses webmail as the primary contact email.

5. A company with an online banking account has about 2 times less probability to cancel than a company without one.

6. A company successfully completing data import at least once has about 2 times less probability to cancel than a company that never completes any data import.

7. A company having 20 or more real contacts (e.g., customer, vendor, or employee) and/or over 80 transactions in QBO, has significantly less probability to cancel.

In the example scenario of QBO cancellation processing, the initial formula for calculating retention value score is a chained multiplication formula based on TABLE 1 below.

Specifically, the retention value score is set to one as a starting value. Each of the parameters SKU (i.e., number of functional modules, such as "SimpleStart," "Essentials," "Plus," "Payroll," etc. in QBO), Import, Recency, number of contact, number of transactions, number of logins, total user counts, and email type are then evaluated for a user to select a multiplication factor from the TABLE 1 entries. Accordingly, the user's retention value score is calculated by successively multiplying the starting value using the multiplication factors for each of the 8 parameters. In addition, the initial formula for calculating the retention value threshold is independent of the human agent availability. Specifically, the user is allowed to cancel directly without human agent intervention if the retention value score is less than 16. The user is sent to a general support queue if the retention value score is between 16 and 20, and sent to dedicated retention specialist queue if the score exceeds 20.

TABLE 1

| Toggle | Value 1 | Value 2 | Value 3 | Value 4 | Value 5 |
| --- | --- | --- | --- | --- | --- |
| 1) SKU | SimpleStart: ×1.3 | Essentials: ×2.5 | Plus: ×4 | Essentials + Payroll: ×5 | Plus + Payroll: ×6 |
| 2) Import | Successfully finished: ×4 | Started, didn't finish: ×2 | Didn't start: ×1 | — | — |
| 3) Recency | | | | | |
| 4) # Contacts | <10: ×0.8 | >=20: ×1.4 | | | |
| 5) # Transactions | <50: ×0.8 | >75 ×1.2 | | | |
| 6) # Logins | <3: ×0.3 | 3-8: ×1.4 | >8: ×3 | | |
| 7) total_user_count | 1: ×1 | >1: ×2 | | | |
| 8) email | @intuit.com: ×0 | @bill.com: ×0.5 | @gmail, yahoo, hotmail, aol: ×0.85 | | |

Starting with the initial formula using statistical methods, a predictive model is fitted to the historical cancellation statistics of 400,000+ users, of which 200,000+ users remained without cancellation, the final formula is based on the TABLE 2 below. In addition, the final formula for calculating the retention value threshold is dependent on the human agent availability. Specifically, if more than 10 users have been sent to the human support call center in the last 10 minutes, the user is allowed to cancel directly without human agent intervention regardless of the retention value score. If the number of users sent to the human support call center in the last 10 minutes is between 10 and 5, an additional user requesting cancellation is sent to the human agent call center if the retention value score exceeds 20 (i.e., the retention value threshold). If the number of users sent to the human support call center in the last 10 minutes is less than 5, an additional user requesting cancellation is sent to the human agent call center if the retention value score exceeds 16 (i.e., 80% of 20).

TABLE 2

| Toggle | Value 1 | Value 2 | Value 3 | Value 4 | Value 5 |
| --- | --- | --- | --- | --- | --- |
| 1) SKU | SimpleStart: ×1.3 | Essentials: ×2.5 | Plus: ×4 | Essentials + Payroll: ×5 | Plus + Payroll: ×6 |
| 2) Import | Successfully finished: ×2 | Started, Did not finish: ×0.75 | Didn't start: ×1 | — | — |

TABLE 2-continued

| Toggle | Value 1 | Value 2 | Value 3 | Value 4 | Value 5 |
|---|---|---|---|---|---|
| 3) Company Created | <=3 days ago ×0.4 | | 90 days-1 yr ×1.2 | | |
| 4) # Contacts | <10: ×0.8 | >=20: ×1.4 | | | |
| 5) # Transactions | <50: ×0.8 | >75 ×1.2 | | | |
| 6) # Logins | <3: ×0.3 | 3-8: ×1.2 | >8: ×1.35 | | |
| 7) total_user_count | 1: ×1.2 | >3: ×2 | | | |
| 8) email | @intuit.com: ×0 | @bill.com: ×0.5 | @gmail, yahoo, hotmail, aol: ×0.85 | | |
| 9) # olb accounts connected | =0: ×0.8 | >1: ×1.6 | | | |
| 10) # last Login date | >21 days ×0.4 | | | | |
| 11) Channel where the company came from | Intuit.com (qb.com etc) ×1.2 | Mobile ×0.3 | | | |
| 12) Owner has another company subscribed | Yes ×0.75 | | | | |
| 13) Has "check" (tx type) | Yes ×1.25 | | | | |

FIG. 3A shows the screenshot A (310) of a new user A who signed up for the online service QBO yesterday, logged on just once, and wants to cancel. The new user A activates the cancel subscription (314) command. The algorithmic computed retention value of this new user A is low and the new user A is allowed to cancel directly. Accordingly, the message A (315) is automatically presented to the new user A confirming cancellation of the subscription.

FIG. 3B shows the screenshot B (320) of another user B whose data indicates that the online service QBO is a perfect fit for user B's business needs. The user B activates the cancel subscription (314) command. The algorithmic computed retention value of this user B is high and human agent bandwidth is allocated to the user B for a retention attempt. Accordingly, the message B (325) is automatically presented to the user B prompting the user B to contact a human agent by calling or chatting with the human agent. In particular, the message B (325) includes a call button and a chat button constituting the aforementioned human agent communication interface.

Figure 4:
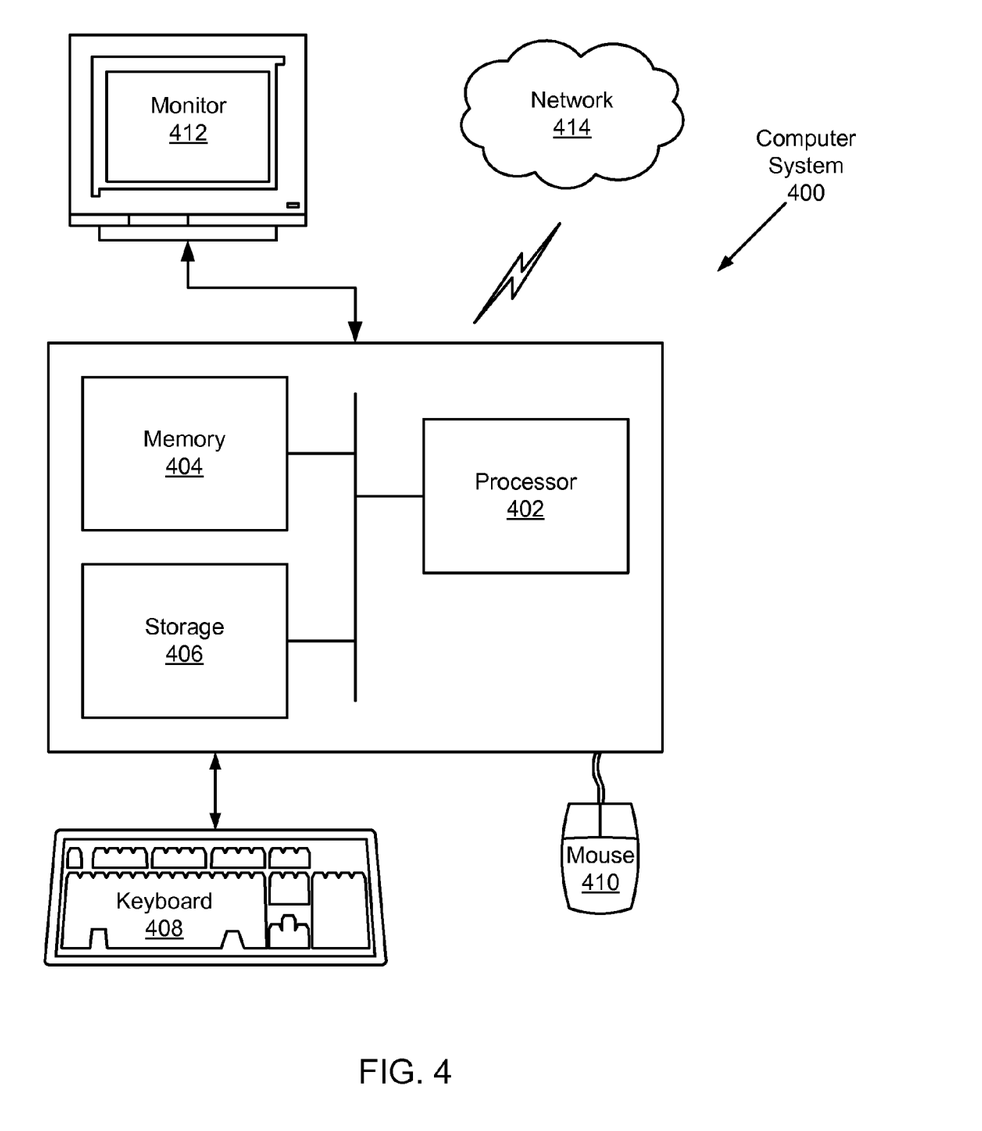
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to process cancellation requests, comprising:
   generating, by a computer processor, a predictive model representing historical cancellation statistics as a function of usage profiles of users requesting cancellation to an online service, wherein generating the predictive model comprises:
   determining a formula of the predictive model for scoring the users based on the usage profiles, and
   calculating an initial retention value threshold of the predictive model for comparing an output of the formula to predict cancellation probability;

receiving, by the computer processor and from a first user, a first request to cancel a first subscription to the online service;

calculating, by the computer processor in response to the first request, a first retention value score of the first user using the formula based on a first usage profile of the first user interacting with the online service;

adjusting, by the computer processor in response to the first request, the initial retention value threshold to generate a first retention value threshold based on a first number of users requesting cancellation who have been directed to support agents within a pre-determined time window prior to receiving the first request; and sending, by the computer processor and in response to the first retention value score exceeding the first retention value threshold, a message to the first user to direct the first user to the support agents to discuss cancelling the first subscription.

2. The method of claim 1, wherein the first usage profile comprises at least one selected from a group consisting of a number of activated functional modules, a number of completed data import, a number of completed transactions, a number of user accounts, and a number of duplicate subscriptions to the online service.

3. The method of claim 2, further comprising:

adjusting the first retention value score based on a business attribute of the first user, wherein the business attribute comprises at least one selected from a group consisting of a type of primary email address, a number of employees, a channel where the first subscription was initiated, whether online banking is used by the user, and whether checks are used by the user.

4. The method of claim 3, further comprising:

adjusting the first retention value score further based on an estimated revenue impact of cancelling the first subscription, wherein the first retention value score is proportional to the estimated revenue impact and availability of the support agents when the first request is received.

5. The method of claim 3, further comprising:

adjusting the first retention value threshold based on an estimated revenue impact of cancelling the first subscription, wherein the first retention value threshold is inversely proportional to the estimated revenue impact and availability of the support agents when the first request is received.

6. The method of claim 1, further comprising:

receiving, from a second user, a second request to cancel a second subscription to the online service;

calculating, in response to the second request:

a second retention value score of the second user based on a second usage profile of the second user interacting with the online service; and a second retention value threshold based on a second number of users requesting cancellation who have been directed to support agents within the pre-determined time window prior to receiving the first request; and cancelling, by the computer processor and in response to the second retention value score being less than the second retention value threshold, the second subscription without requesting the second user to contact the support agents.

7. The method of claim 1, further comprising:

obtaining a historical cancellation percentage of a plurality of users using the online service, wherein the historical cancellation percentage represents a percentage of the plurality of users that cancelled the online service within a pre-determined time period;

determining, based on the historical cancellation percentage and according to a pre-determined algorithm, a formula for calculating the first retention value score and the first retention value threshold;

calculating, using the formula, a hypothetical retention value score and a hypothetical retention value threshold for each of the plurality of users during the pre-determined time period; and adjusting the formula based on a comparison of the historical cancellation percentage and a percentage of the plurality of users having the hypothetical retention value score being less than the hypothetical retention value threshold.

8. A cancellation processing system, comprising:

a processor;

a cancellation analyzer executing on the processor and configured to generate a predictive model representing historical cancellation statistics as a function of usage profiles of users requesting cancellation to an online service, wherein generating the predictive model comprises:

determining a formula of the predictive model for scoring the users based on the usage profiles, and calculating an initial retention value threshold of the predictive model for comparing an output of the formula to predict cancellation probability;

a retention value calculator executing on the processor and configured to:

calculate, in response to a first request from a first user to cancel a first subscription to an online service first retention value score of the first user using the formula based on a first usage profile of the first user interacting with the online service; and adjust, in response to the first request, the initial retention value threshold to generate a first retention value threshold based on a first number of users requesting cancellation who have been directed to support agents within a pre-determined time window prior to receiving the first request;

a user module executing on the processor and configured to:

receive the first request from the first user; and send, in response to the first retention value score exceeding the first retention value threshold, a message to the first user to direct the first user to the support agents to discuss cancelling the first subscription; and a repository configured to store the first usage profile.

9. The system of claim 8, wherein the first usage profile comprises at least one selected from a group consisting of a number of activated functional modules, a number of completed data import, a number of completed transactions, a number of user accounts, and a number of duplicate subscriptions to the online service.

10. The system of claim 8, wherein the retention value calculator is further configured to:

adjust the first retention value score based on a business attribute of the first user, wherein the business attribute is stored in the repository and comprises at least one selected from a group consisting of a type of primary email address, a number of employees, a channel where the first subscription is subscribed, whether online banking is used by the user, and whether checks are used by the user.

11. The system of claim 10, wherein the retention value calculator is further configured to:
adjust the first retention value score further based on an estimated revenue impact of cancelling the first subscription,
wherein the first retention value score is proportional to the estimated revenue impact and availability of the support agents when the first request is received.

12. The system of claim 10, wherein the retention value calculator is further configured to:
adjust the first retention value threshold based on an estimated revenue impact of cancelling the first subscription,
wherein the first retention value threshold is inversely proportional to the estimated revenue impact and availability of the support agents when the first request is received.

13. The system of claim 8,
wherein the retention value calculator is further configured to calculate, in response to a second request from a second user to cancel a second subscription to the online service:
a second retention value score of the second user based on a second usage profile of the second user interacting with the online service; and
a second retention value threshold based on a second number of users requesting cancellation who have been directed to support agents within the pre-determined time window prior to receiving the first request, and
wherein the user module is further configured to:
receive the second request from the second user; and
cancel, in response to the second retention value score being less than the second retention value threshold, the second subscription without requesting the second user to contact the support agents.

14. The system of claim 8, further comprising a cancellation analyzer configured to:
obtain a historical cancellation percentage of a plurality of users using the online service, wherein the historical cancellation percentage represents a percentage of the plurality of users that cancelled the online service within a pre-determined time period;
determine, based on the historical cancellation percentage and according to a pre-determined algorithm, a formula for calculating the first retention value score and the first retention value threshold;
calculate, using the formula, a hypothetical retention value score and a hypothetical retention value threshold for each of the plurality of users during the pre-determined time period; and
adjust the formula based on a comparison of the historical cancellation percentage and a percentage of the plurality of users having the hypothetical retention value score being less than the hypothetical retention value threshold.

15. A non-transitory computer readable medium storing instructions to process cancellation requests, the instructions, when executed by a computer processor, comprising functionality to:
generate a predictive model representing historical cancellation statistics as a function of usage profiles of users requesting cancellation to an online service, wherein generating the predictive model comprises:
determining a formula of the predictive model for scoring the users based on the usage profiles, and
calculating an initial retention value threshold of the predictive model for comparing an output of the formula to predict cancellation probability;
receive, from a first user, a first request to cancel a first subscription to the online service;
calculate, in response to the first request, a first retention value score of the first user using the formula based on a first usage profile of the first user interacting with the online service;
adjust, in response to the first request, the initial retention value threshold to generate a first retention value threshold based on a first number of users requesting cancellation who have been directed to support agents within a pre-determined time window prior to receiving the first request; and
send, in response to the first retention value score exceeding the first retention value threshold, a message to the first user to direct the first user to the support agents to discuss cancelling the first subscription.

16. The non-transitory computer readable medium of claim 15,
wherein the first usage profile comprises at least one selected from a group consisting of a number of activated functional modules, a number of completed data import, a number of completed transactions, a number of user accounts, and a number of duplicate subscriptions to the online service.

17. The non-transitory computer readable medium of claim 16, further comprising:
adjusting the first retention value score based on a business attribute of the first user,
wherein the business attribute comprises at least one selected from a group consisting of a type of primary email address, a number of employees, a channel where the first subscription was initiated, whether online banking is used by the user, and whether checks are used by the user.

18. The non-transitory computer readable medium of claim 17, the instructions, when executed by the computer processor, further comprising functionality to:
adjust the first retention value score further based on an estimated revenue impact of cancelling the first subscription,
wherein the first retention value score is proportional to the estimated revenue impact and availability of the support agents when the first request is received.

19. The non-transitory computer readable medium of claim 17, the instructions, when executed by the computer processor, further comprising functionality to:
adjust the first retention value threshold based on an estimated revenue impact of cancelling the first subscription,
wherein the first retention value threshold is inversely proportional to the estimated revenue impact and availability of the support agents when the first request is received.

20. The non-transitory computer readable medium of claim 15, the instructions, when executed by the computer processor, further comprising functionality to:

receive, from a second user, a second request to cancel a second subscription to the online service;

calculate, in response to the second request:
- a second retention value score of the second user based on a second usage profile of the second user interacting with the online service; and
- a second retention value threshold based on a second number of users requesting cancellation who have been directed to support agents within the pre-determined time window prior to receiving the first request; and cancel, by the computer processor and in response to the second retention value score being less than the second retention value threshold, the second subscription without requesting the second user to contact the support agents.

21. The non-transitory computer readable medium of claim 15, the instructions, when executed by the computer processor, further comprising functionality to:

obtain a historical cancellation percentage of a plurality of users using the online service, wherein the historical cancellation percentage represents a percentage of the plurality of users that cancelled the online service within a pre-determined time period;

determine, based on the historical cancellation percentage and according to a pre-determined algorithm, a formula for calculating the first retention value score and the first retention value threshold;

calculate, using the formula, a hypothetical retention value score and a hypothetical retention value threshold for each of the plurality of users during the pre-determined time period; and adjust the formula based on a comparison of the historical cancellation percentage and a percentage of the plurality of users having the hypothetical retention value score being less than the hypothetical retention value threshold.

* * * * *